(12) United States Patent
Giyazov et al.

(10) Patent No.: US 8,513,480 B2
(45) Date of Patent: Aug. 20, 2013

(54) HYDROISOMERIZATION AND ISOMERIZATION PROCESS USING REACTIVE RECTIFICATION COLUMN

(75) Inventors: Oleg Valerievich Giyazov, Kirishi (RU); Oleg Igorevich Parputs, Kirishi (RU)

(73) Assignee: "RRT", Ltd., St. Petersburg (RU)

( * ) Notice: Subject to any disclaimer, the term of this patent is extended or adjusted under 35 U.S.C. 154(b) by 65 days.

(21) Appl. No.: 13/353,575

(22) Filed: Jan. 19, 2012

(65) Prior Publication Data
US 2012/0184790 A1    Jul. 19, 2012

Related U.S. Application Data

(60) Provisional application No. 61/434,427, filed on Jan. 19, 2011.

(51) Int. Cl.
*C07C 5/22* (2006.01)
*C07C 5/27* (2006.01)

(52) U.S. Cl.
USPC .................... 585/736; 585/737; 585/750

(58) Field of Classification Search
USPC ..................................... 585/736, 738, 750
See application file for complete search history.

(56) References Cited

U.S. PATENT DOCUMENTS
6,137,023 A * 10/2000 Dorbon et al. ............... 585/664

FOREIGN PATENT DOCUMENTS
WO    2006088528 A2    8/2006

* cited by examiner

*Primary Examiner* — Thuan D Dang
(74) *Attorney, Agent, or Firm* — Patentbar International, P.C.

(57) ABSTRACT

A reaction-rectification process is performed in an integrated reaction-rectification system which combines catalytic isomerization and hydroisomerization reactors and distillations zones in an integral column.

17 Claims, 3 Drawing Sheets

ND ISOMERIZATION PROCESS USING REACTIVE RECTIFICATION COLUMN

CROSS-CLAIM TO A RELATED APPLICATION

This application claims priority to an earlier filed U.S. provisional patent application Ser. No. 61/434,427 filed on Jan. 19, 2011, which provisional application is incorporated herein by reference in its entirety.

FIELD OF THE INVENTION

The invention relates to the production of high-octane components of motor fuels, as well as to the components used in the oil refining and petrochemical industries.

BACKGROUND OF THE INVENTION

The present invention relates to the technological process pertaining to a single reactive rectification process. The reactive-rectification process which combines different types of catalytic zone and distillation zone in a single column apparatus is functionally designed to improve environmental performance, detonation and other properties of high-octane components of motor fuels and components used in the oil refining and petrochemical industries.

SUMMARY OF THE INVENTION

The term "reactive-rectification process" is used to describe both the combined process of catalytic reactions and the distillation process in a column apparatus. To describe the process, it is also possible to use the terms "reactive distillation", "catalytic distillation" and any other term that describes both the combined process of the catalytic reaction and the distillation process in a column apparatus.

A reactive distillation process is accomplished with a single reactive distillation system, combining catalytic reactors of isomerization and hydroisomerization, distillation zones in a single column apparatus, as well as appropriate equipment such as pumps, heat exchangers, separators, circulation hydrogen compressor. The reactive distillation process is aimed to improve the environmental performance, detonation and other properties of hydrotreated straight-run light gasoline fractions, in conjunction with the light fraction of the reformate, containing mainly benzene and other components with a boiling point close to that of benzene.

The reactive distillation process is usually run without any external recycle streams of non-reacted hydrocarbons. It is beneficial to spend the energy released by the reactions taking place in the isomerization reaction zones, predominantly by the hydroisomerization reactions, on evaporating the liquid in the reactive distillation column. Thus, the energy consumption of the reactive distillation system is reduced as a whole.

The reactive distillation process comprises at least four distillation zones and three reaction zones. At least one reaction zone is located inside the reactive distillation column. The remaining reaction zones are located inside the reactive distillation column, but they can also be located outside of the reactive distillation column and are made as stand-alone equipment still being a part of the reactive-rectification system and process.

The distillation zones carrying continuous fractionation may include rectification trays, mass transfer loose packing, mass transfer structured packings.

The reaction system of the reactive distillation column comprises essentially three reaction zones. At least one reaction zone is a zone of hydroisomerization of hydrocarbons, characterized by the molecules having 6 or more carbon atoms, as well as saturated and unsaturated paraffins, normal and isoparaffins, naphthenes, aromatic hydrocarbons, such as benzene. At least two reaction zones are the areas of isomerization of hydrocarbons, characterized preferably by their molecule having from 5 to 8 carbon atoms (C5-C8), such as saturated and unsaturated paraffins, normal and isoparaffins, naphthenes, aromatic hydrocarbons.

A method of hydroizomerization and isomerization of C4-C8 hydrocarbon fractions during simultaneous chemical reaction and distillation, the method comprising feeding a fraction of C4-C8 hydrocarbons into a distillation zone column disposed between an isomerization reaction zone reactor and a hydroisomerizarion reaction zone reactor, the hydrocarbons comprising from about 0% to about 30% mass of benzene; supplying paraffin C4-C6 hydrocarbon from a feed of a reaction-rectification column to an isomerization reaction zone disposed higher than the feed; supplying aromatic, naphtenic and paraffin hydrocarbons C7 and heavier from the feed of a reaction-rectification column to a hydroisomerization reaction zone disposed lower than the feed; feeding paraffin hydrocarbons C5 and lighter from a distillation zone disposed between the izomerization reaction zone and the hydroisomerization reaction zone into a second isomerization zone disposed higher than a lateral selector of the reaction-rectification column; obtaining C5 and heavier paraffin hydrocarbons by a stream out of the top of the reaction-rectification column, then condensing the steam and blowing off a hydrogen-containing gas; obtaining C6 paraffin hydrocarbons of a normal and iso-structures from a stream out of the lateral selector of the reaction-rectification column; and obtaining C6 and heavier naphtenic hydrocarbons and C7 and heavier hydrocarbons from a stream out of the bottom of the reaction-rectification column.

The method further comprises performing the isomerization reaction and the hydroisomerization reaction in three catalytic zones inside the reaction-rectification column.

The method further comprises performing the isomerization reaction in catalytic zones outside of the reaction-rectification column, wherein a stream from a catalytic zone outside of the reaction-rectification column returns to the column for separation and return of the non-reacted components.

The method further comprises at least one reaction zone disposed inside the reaction-rectification column.

The method further comprises hydroisomerizing of benzene in a lower reaction zone of the column.

The method further comprises mixing of hydrogen and hydrocarbons in a reaction zone, wherein the hydrogen is separately supplied to each reaction zone in varying quantities.

The method further comprises selectively isomerizing C6 hydrocarbons by contacting them with hydrogen on a catalyst in the isomerization reaction zone dispose between the feed of the reaction-rectification column and the lateral selector.

The method further comprises selectively hydroisomerizing aromatic hydrocarbons by contacting them with hydrogen on a hydroisomerization catalyst in a hydroisomerization reaction zone disposed lower than the feed of the reaction-rectification column.

The method further comprises comprising selectively isomerizing C5 hydrocarbons by contacting them with hydrogen on an isomerization catalyst in a isomerization reaction zone disposed in an upper portion of the reaction-rectification column.

The stream out of the top of the reaction-rectification column comprises isopentane. The stream out of the lateral selector of the reaction rectification column comprises isohexanes, such as 2-,3-methylpentanes, 2,2-,2,3-dimethylbutanes. The stream out of the bottom of the reaction-rectification column comprises cyclohexane and methylcyclopentane.

The pressure in the reaction-rectification column is in a range from about 10 atm to about 40 atm. The temperature of the reaction-rectification column is in a range from about 80° C. to about 300° C.

The method further comprises hydrocarbons mixed with hydrogen in a molar ratio of hydrogen to hydrocarbons is in a range from about 0.1 to 1 to about 3 to 1.

The method further comprises comprising using a group VIII metal deposited on a zeolite as a catalyst in a lower hydroisomerization zone.

The method further comprises using a group VIII metal deposited on a group IV metal oxide as a catalyst, which is enhanced with sulfate and/or tungsten ions.

Description of the Operating Conditions of the Reactive Rectification Process

Operating conditions of the reactive rectification process are usually determined by the following parameters. The pressure in the reactive distillation column is the range of about 1 to about 40 bar absolute, preferably in the range of about 30 to about 35 bar absolute.

The temperature inside the top of the reactive distillation column is usually in between about 80 and about 220° C., preferably in the range from about 150 to about 200° C., the temperature inside the bottom of the reactive distillation column is usually in the range from about 120 to about 350° C., preferably in the range from about 220 to about 280° C. The molar ratio of hydrogen to raw materials is typically in the range from about 0.01 to about 3.0, preferably in the range of about 0.08 to about 1.5.

The operating conditions for the reaction zones located inside the reaction distillation column are determined by the technological parameters in the reaction distillation column, by the optimal technological parameters for the reactions of isomerization, and/or hydrogenation and/or hydroisomerization. Those parameters are in the range between the parameter values inside the top and inside the bottom of the reaction distillation column. For example, the pressure is selected from the rage from about 1 to about 40 bar absolute, preferably from about 30 to 35 bar absolute. The temperature is selected from the rage of about 80 to 350° C., preferably from about 150 to 280° C.

The operating conditions for the reaction zones disposed outside of the reactive distillation column are usually determined by the following values. The pressure is in the range of about 1 to about 60 bar absolute, preferably in the range of about 5 to about 35 bar absolute. The temperature is usually in the range of about 60 to about 400° C., preferably in the range of about 100 to about 300° C. The molar ratio of hydrogen to raw materials is typically in the range of about 0.01 to about 3.0, preferably in the range of about 0.08 to about 1.5.

Description of the Structure of the Reaction Zones

The structure of the reaction zones disposed inside the reactive rectification column is functionally designed to primarily conduct the catalytic reaction. However, it can also serve as a distillator.

The reaction zone is of the type "with the flow of fluid of the same direction as the flow of the hydrogen gas rising up through the catalytic bed".

In the reaction zone the catalyst is placed in the tube and/or containers located on the grid which supports the catalyst and also delivers the hydrogen-containing gas to the reaction zone.

The fluid containing C5-C8 hydrocarbons flows down into the reaction zone from the distillation zone located above in the reaction zone. Inside the reaction zone the movement of the fluid is co-directional with the flow of a hydrogen-containing gas, which moves upwardly through the catalytic bed. Such an arrangement allows the isomerization and/or hydrogenation and/or hydroisomerization reactions to occur at a high or a low reaction rate.

The vapor phase is formed during evaporation of the low-boiling hydrocarbons of normal and isomeric structures. The vapor phase enters the reaction zone from the lower disposed distillation zone. The vapor flows through the tube and/or containers located adjacently with respect to the catalyst-filled tubes and/or containers. The fluid can be drained along the same catalyst-filled tubes and/or containers in which the vapor phase rises up. The catalyst-filled tubes and/or containers in which the vapor raises up can be hollow or filled with structured or non-structured inert mass-exchanging packings for improving the process of mass exchange.

Delivery of the hydrogen-containing gas to the reaction zone is accomplished by a pipeline coupled, preferably, to the bottom part of the reaction zone. Distribution and delivery of the hydrogen-containing gas into the catalyst-filled tubes and/or containers is accomplished by the distribution device and/or a distribution collector for the hydrogen-containing gas disposed, preferably, at the bottom part of the reaction zone.

The reaction zones located outside of the reactive-distillation column can be implemented as axial or radial feed reactors used in typical isomerization and hydroisomerization processes.

Description of the Catalysts Used in the Reactive Distillation Process

Catalysts used in the hydroisomerization reaction zones are those containing metals of Group VIII of the periodic table deposited onto the substrates (for example. my methods of codeposition or impregnation), such as active aluminum oxide, beta-zeolite, pentasils (ZSM-5 type), mordenite. The referenced substrates can be modified by halogens, such as F and/or Cl and other elements.

The preferred catalysts are based on synthetic and/or natural mordenite mixed with active aluminum oxide modified by halogens, such as Cl and/or F. Metals of Group VIII, such as Ni, Pt, Pd, are deposited onto the substrate.

The catalysts used in the isomerization reaction zones inside the reactive distillation columns are those containing metals of Group VIII of the periodic table, such as Ni, Pt, Pd, deposited onto the following substrates: $ZrO_2/SO_4$ ($SO_3$), $ZrO_2/W_2O_3$, the so-called solid superacids. Solid and/or deposited heteropolyacids can be used as catalysts. These catalysts can be enhanced with Mn, Fe, halogens Cl and/or F and other elements.

The majority of modern standard isomerization catalysts, such as Pt on zeolite or chlorated aluminum oxide, can be used in the isomerization reaction zones disposed outside the reactive distillation columns.

DETAILED DESCRIPTION OF THE PREFERRED EMBODIMENTS

Figure 1:
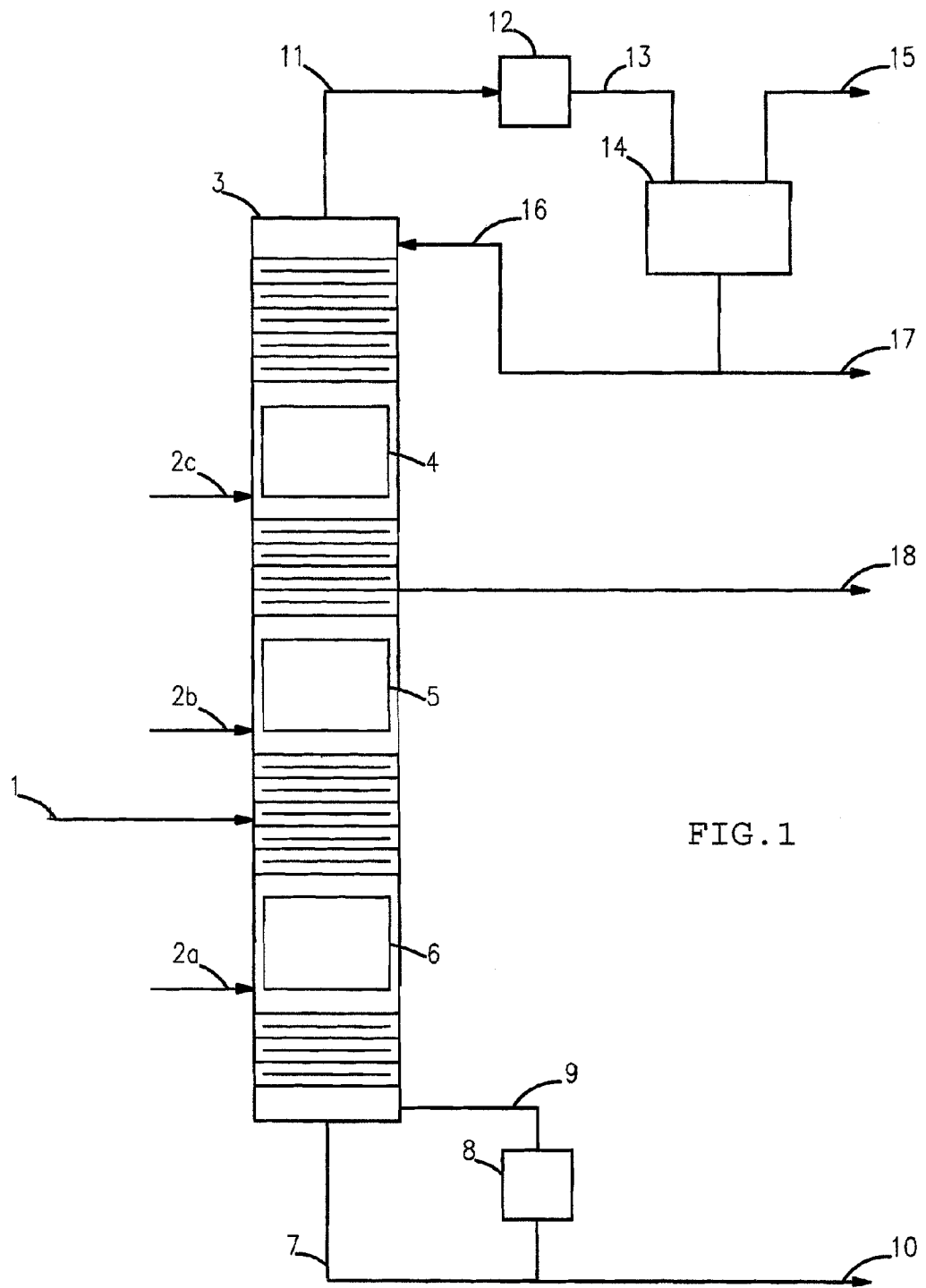
FIG. 1 is a schematic illustration of the reactive distillation column.

FIG. 1 illustrates the structure corresponding to a reactive rectification process in which all reaction zones are located inside the reactive distillation column (3).

Hydrocarbons are raw materials fed into a reactive distillation column (3). Preferably those types of hydrocarbons have a molecular structure comprising 5 or more carbon atoms, including saturated and unsaturated paraffins, normal and isoparaffins, naphthenes, aromatic hydrocarbons, which are usually the hydrotreated products of the primary distillation process of crude oil. In particular, these are hydrotreated straight-run light gasoline fractions and catalytic reforming, such as a light fraction of reformate, containing mainly benzene and other components with a boiling point close to that of benzene (such as C7 hydrocarbons and cyclohexane). The raw materials are fed into the reactive distillation column (3) through path (1).

The reactive distillation column comprises three reaction zones (4), (5), (6) between the distillation zones located inside the reactive distillation column (3).

Reaction zones (4), (5) are located in proximity to the upper and middle parts of the reactive distillation column (3), respectively. The isomerization catalyst (of a type described above, for example, Pt deposited onto the following substrates: $ZrO_2/SO_4$ ($SO_3$), $ZrO_2/W_2O_3$) is loaded into the reaction zones (4), (5) where the isomerization reaction of hydrocarbons takes place. The hydrocarbons preferably are paraffin hydrocarbons of the molecular structure comprising from 5 to 8 carbon atoms, including saturated and unsaturated paraffins, normal and isoparaffins, naphthenes, aromatic hydrocarbons.

The reaction zone (6) is located preferably in proximity to the lower part of the reactive distillation column (3). The hydroisomerization catalyst (for example, Pt on modernite) is loaded into the reaction zone (6) where the reaction of hydrogenation and hydroisomerization of hydrocarbons takes place. Hydrocarbons have a molecular structure of 6 or more carbon atoms, including saturated and unsaturated paraffins, normal and isoparaffins, naphthenes, aromatic hydrocarbons, such as benzene. The hydroisomerization of benzene leads to the formation of cyclohexane, and methylcyclopentan, wherein benzene is hydroisomerized to methylcyclopentane. The exothermic effect of the hydrogenation reaction is spent on evaporating the liquid in the reaction zone, thereby reducing the power consumption of the boiler of the reactive distillation column (8) and the power consumption of the reactive distillation system as a whole.

The hydrogen-containing gas is fed into the reaction zone along the paths (2c), (2b), (2a) preferably in the lower part of the reaction zones (4), (5), (6), respectively.

A stream of gas exiting the column through its top along path (11) comprises the products of the isomerization reaction, such as isopentane, as well as the hydrogen-containing gas and hydrocarbons, comprising from 2 to 4 atoms of carbon. The products are produced as a result of the cracking reaction in the reaction zones—the two izomerization reaction zones and the hydroisomerization reaction zone.

In order to provide for the formation of the liquid distillate used for the reflux in the reactive distillation column and for the selection of the distillate product stream, the gas stream exiting the upper part of the column via path (11) is fed to the condenser (12). From condenser (12) the stream flows along path (13) and is collected in the distillate collector (14) as a liquid and vapor. The vapor phase, which comprises non-condensed hydrocarbons, leaves collector (14) of the reactive distillation system along path (15). The liquid phase exits collector (14) along the paths (16), (17) as the reflux of reactive distillation column (3) and the product of the distillate selection, respectively.

The path (18) for lateral selection of products (18) via a lateral selector is disposed between isomerization reaction zones (4), (5) in the reactive distillation column in the distillation zone. The selected products are predominantly high-octane hydrocarbons, comprising from 5 to 7 carbon atoms, including hydrocarbons, such as isopentane, methylpentanes, dimethylbutanes, and other hydrocarbons that are usually isostructurs and methylcyclopentane.

The liquid product is fed from the bottom portion of the reactive distillation column (3) to the boiler of the reactive distillation column (8) via path (7). Boiler (8) alone or together with the hydroisomerization reaction zone (6) provides the necessary steam of vapor at the bottom of the reactive distillation column (3). Boiler (8) also maintains a stable operating condition in the reactive distillation column. Steam vapor from the boiler (8) returns to the bottom portion of the reactive distillation column (3). The liquid flow leaves the reactive distillation system via path (10) as a bottom product. The bottom product comprises hydrocarbons with preferably 6 or more carbon atoms, including cyclohexane and methylcyclopentane, wherein the concentration of methylcyclopentane is higher than that of cyclohexane.

Figure 2:
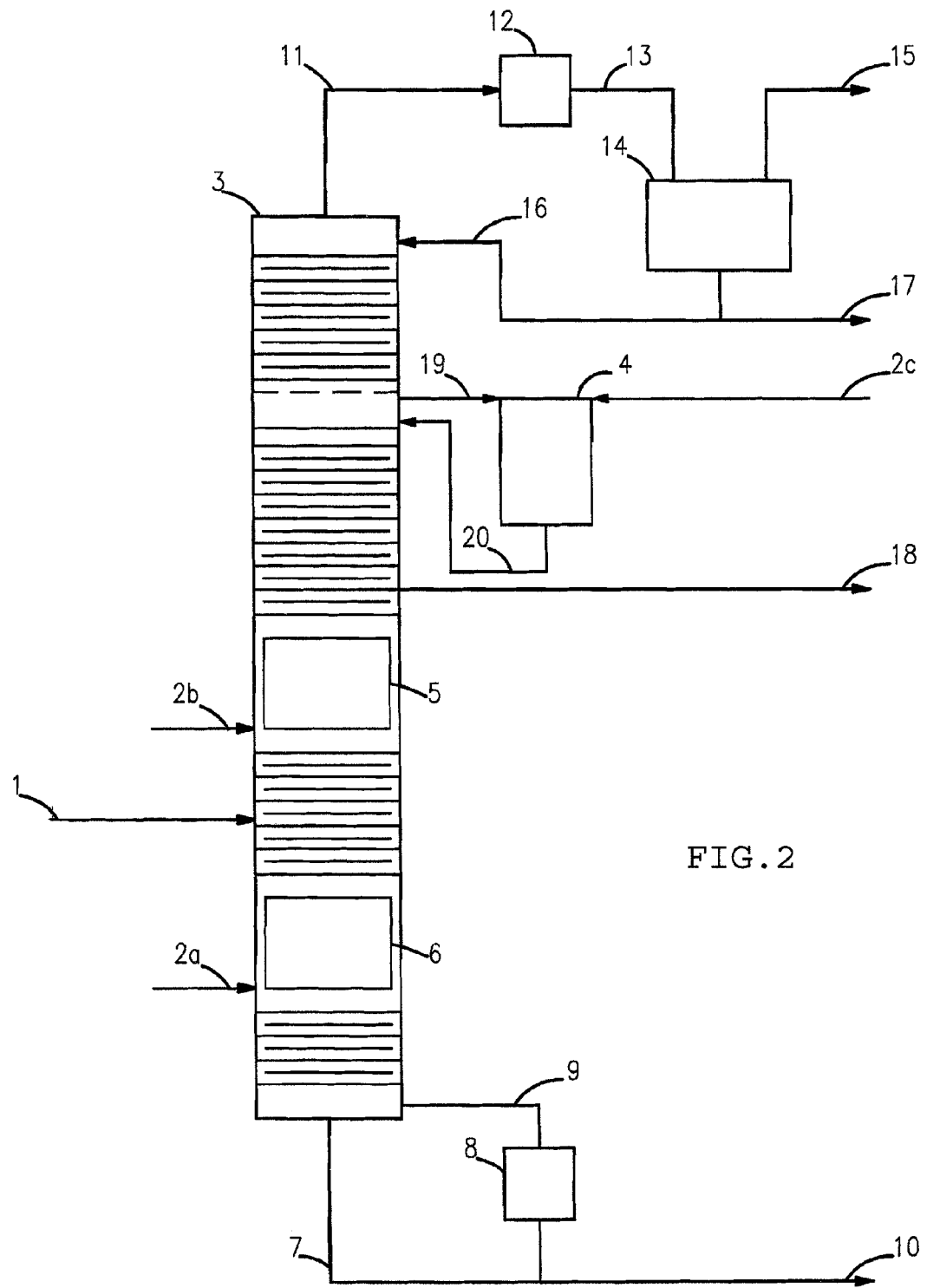
FIG. 2 is a schematic illustration of another embodiment of the reactive distillation column

FIG. 2 illustrates the structure corresponding to the reactive rectification process, in which at least one isomerization reaction zone is disposed outside of the reactive distillation column (3).

The schematic illustration of the reactive rectification process shown in FIG. 2 is similar to that of the reactive rectification process shown in FIG. 1, except for the following differences:

The liquid and/or vapor phase is fed from the distillation zone, disposed closer to the upper part of the reactive distillation column (3) to the isomerization reaction zone (4) through path (19). The isomerization reactive zone (4) is implemented as a stand-alone device with the appropriate equipment, which remains a part of the reactive distillation system. The products of the isomerization reaction in the liquid and/or vapor phase are returned to the reactive distillation column (3) via path (20). The hydrogen gas is fed to the upper reaction zone (4) via path (2c) or mixed with the liquid and/or steam vapor from line (19) and then the mixture is fed to the upper part of the reaction zone (4).

Figure 3:
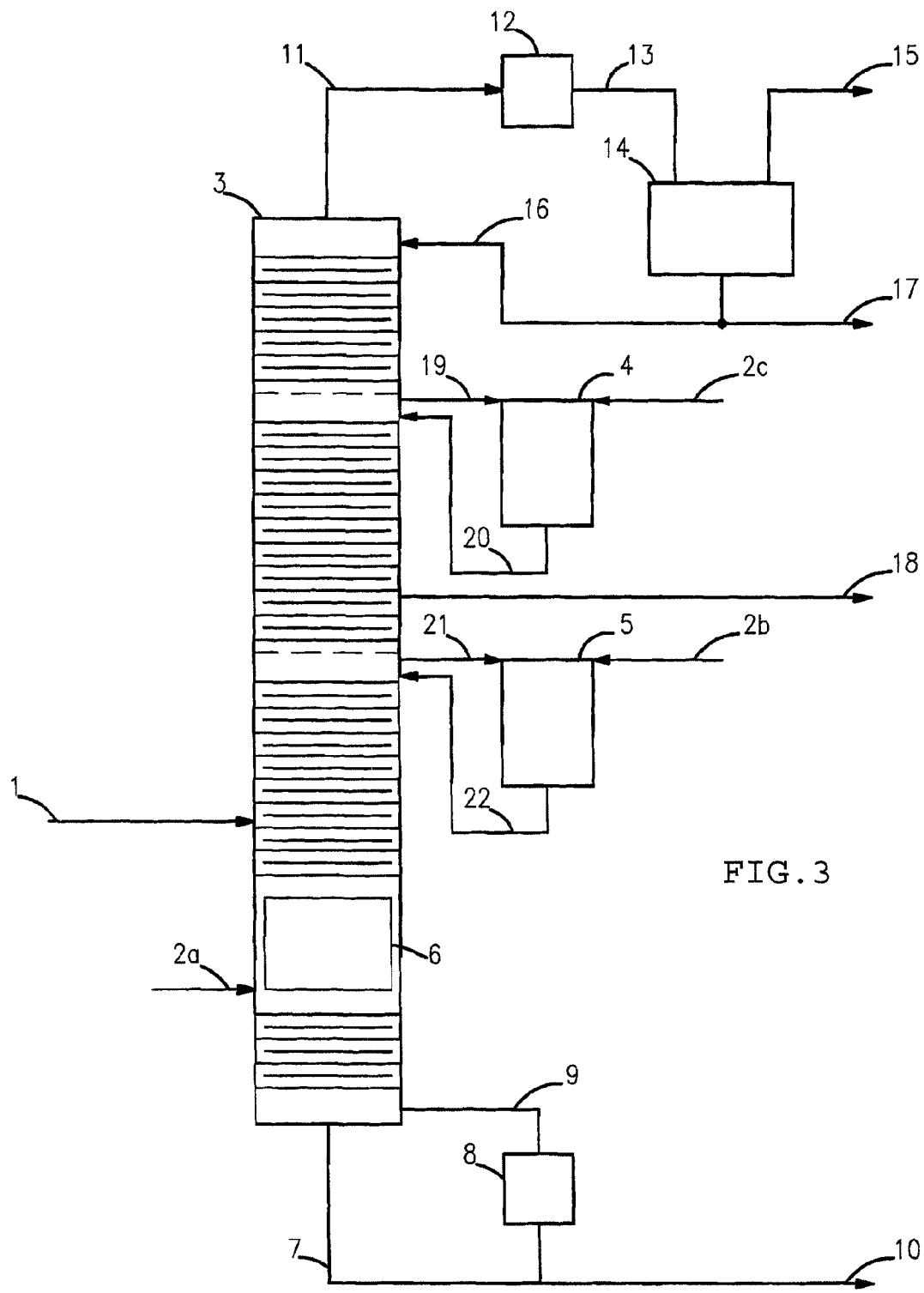
FIG. 3 is a schematic illustration yet another embodiment of the reactive distillation column

FIG. 3 illustrates the structure for the implementation of a reactive rectification process, wherein at least two isomerization reaction zones are located outside of the reactive distillation column (3).

The schematic illustration of the reactive rectification process illustrated by FIG. 3 is similar the schematic illustration of the reactive rectification process described with regard to FIG. 2, except for the following differences:

The liquid and/or vapor phase is fed via path (1) from the distillation zone to the isomerization reaction zone (5). The distillation zone is disposed between the feed of a reaction-rectification column for feeding the raw materials into a reactive distillation column (3) along path (1), and the lateral selector of side product (18) along path (21). The isomerization reaction zone (5) is implemented as a stand-alone device with the appropriate equipment and remains a part of the reactive distillation system. The liquid or vaporous products of the isomerization reaction are returned to the reactive distillation column (3) along path (22). The hydrogen gas is fed to the upper part of the reaction zone (5) via the line (2b) or mixed with liquid and/or vapor flow from line (21) and then the mixture is fed to the upper part of the reaction zone (5).

What is claimed is:

1. A method of hydroizomerization and isomerization of C4-C8 hydrocarbon fractions during simultaneous chemical reaction and distillation, the method comprising:
    feeding a fraction of C4-C8 hydrocarbons into a distillation zone column disposed between an isomerization reaction zone reactor and a hydroisomerizarion reaction zone reactor, the hydrocarbons comprising from about 0% to about 30% mass of benzene;
    supplying paraffin C4-C6 hydrocarbon from a feed of a reaction-rectification column to an isomerization reaction zone disposed higher than the feed;
    supplying aromatic, naphthenic and paraffin hydrocarbons C7 and heavier from the feed of the reaction-rectification column to a hydroisomerization reaction zone disposed lower than the feed;
    feeding paraffin hydrocarbons C5 and lighter from a distillation zone disposed between the izomerization reaction zone and the hydroisomerization reaction zone into a second isomerization zone disposed higher than a lateral selector of the reaction-rectification column;
    obtaining C5 and heavier paraffin hydrocarbons by a stream out of the top of the reaction-rectification column, then condensing the stream and blowing off a hydrogen-containing gas;
    obtaining C6 paraffin hydrocarbons of a normal and iso-structures from a stream out of the lateral selector of the reaction-rectification column; and
    obtaining C6 and heavier naphtenic hydrocarbons and C7 and heavier hydrocarbons from a stream out of the bottom of the reaction-rectification column.

2. The method of claim 1, comprising performing the isomerization reaction and the hydroisomerization reaction in three catalytic zones inside the reaction-rectification column.

3. The method of claim 1, comprising performing the isomerization reaction in catalytic zones outside of the reaction-rectification column, wherein a stream from a catalytic zone outside of the reaction-rectification column returns to the column for separation and return of the non-reacted components.

4. The method of claim 1, wherein at least one reaction zone is disposed inside the reaction-rectification column.

5. The method of claim 1, further comprising hydroisomerizing of benzene in a lower reaction zone of the column.

6. The method of claim 1, further comprising mixing of hydrogen and hydrocarbons in a reaction zone, wherein the hydrogen is separately supplied to each reaction zone in varying quantities.

7. The method of claim 1, further comprising selectively isomerizing C6 hydrocarbons by contacting them with hydrogen on a catalyst in the isomerization reaction zone dispose between the feed of the reaction-rectification column and the lateral selector.

8. The method of claim 1, further comprising selectively hydroisomerizing aromatic hydrocarbons by contacting them with hydrogen on a hydroisomerization catalyst in a hydroisomerization reaction zone disposed lower than the feed of the reaction-rectification column.

9. The method of claim 1, further comprising selectively isomerizing C5 hydrocarbons by contacting them with hydrogen on an isomerization catalyst in an isomerization reaction zone disposed in an upper portion of the reaction-rectification column.

10. The method of claim 1, wherein the stream out of the top of the reaction-rectification column comprises isopentane.

11. The method of claim 1, wherein the stream out of the lateral selector of the reaction rectification column comprises isohexanes, including 2-,3-methylpentanes, 2,2-,2,3-dimethylbutanes.

12. The method of claim 1, wherein the stream out of the bottom of the reaction-rectification column comprises cyclohexane and methylcyclopentane.

13. The method of claim 1, wherein a pressure in the reaction-rectification column is in a range from about 10 atm to about 40 atm.

14. The method of claim 1, wherein a temperature of the reaction-rectification column is in a range from about 80° C. to about 300° C.

15. The method of claim 1, wherein hydrocarbons are mixed with hydrogen in a molar ratio of hydrogen to hydrocarbons is in a range from about 0.1 to 1 to about 3 to 1.

16. The method of claim 1, further comprising using a group VIII metal deposited on a zeolite as a catalyst in a lower hydroisomerization zone.

17. The method of claim 1, further comprising using a group VIII metal deposited on a group IV metal oxide as a catalyst, which is enhanced with sulfate and/or tungsten ions.

* * * * *